Figure 9:
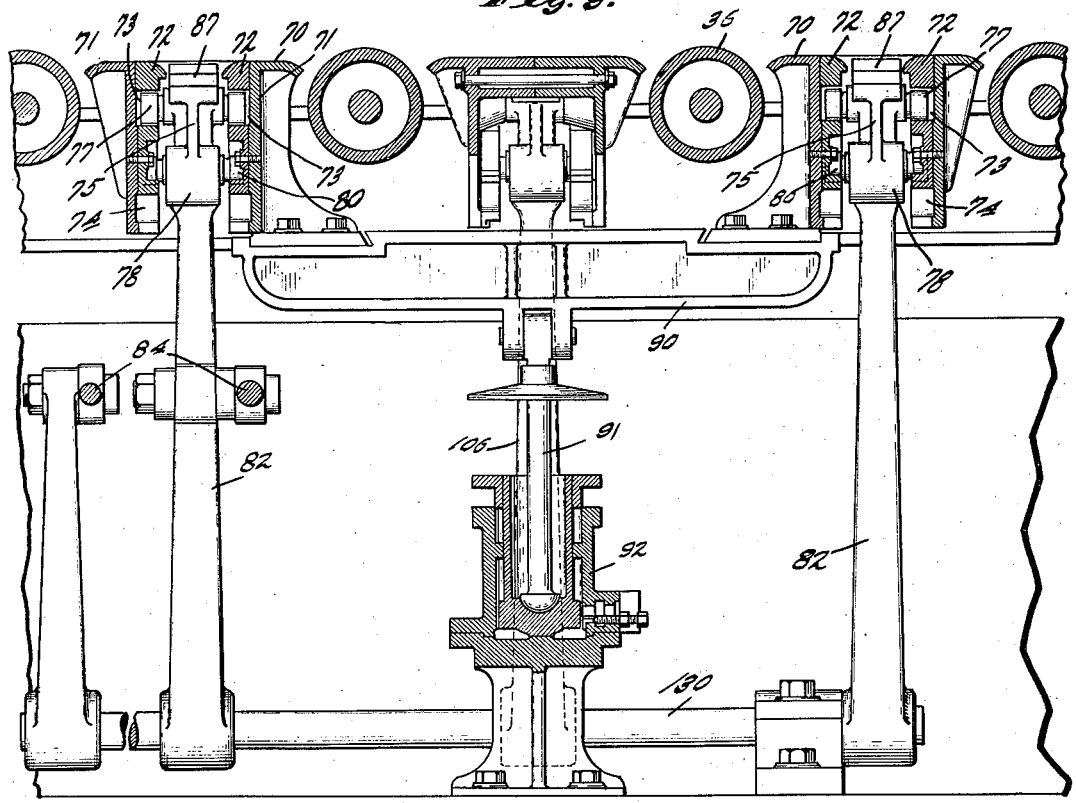

C. W. A. KOELKEBECK.
BAR MILL.
APPLICATION FILED JAN. 10, 1916.
1,191,920.
Patented July 18, 1916.
13 SHEETS—SHEET 1.
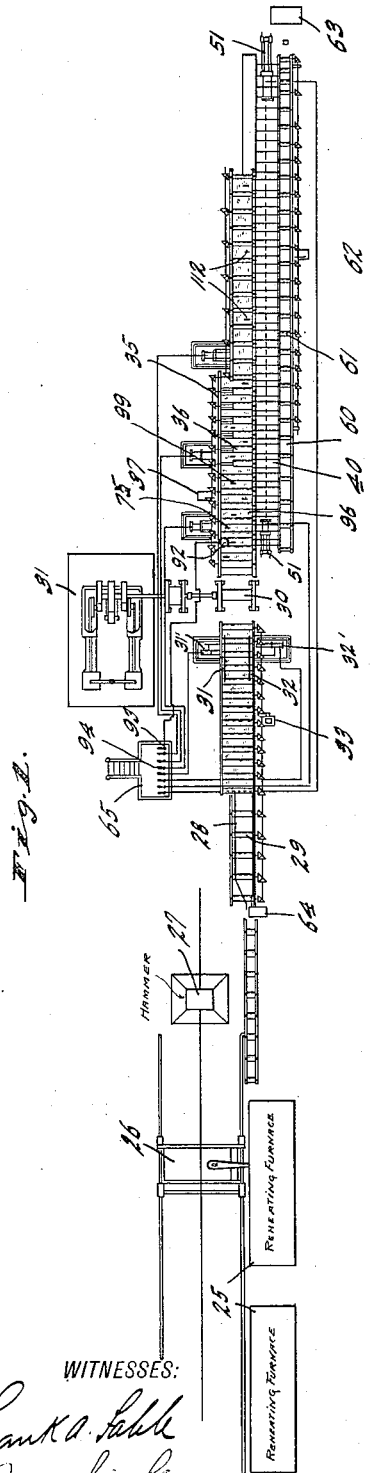
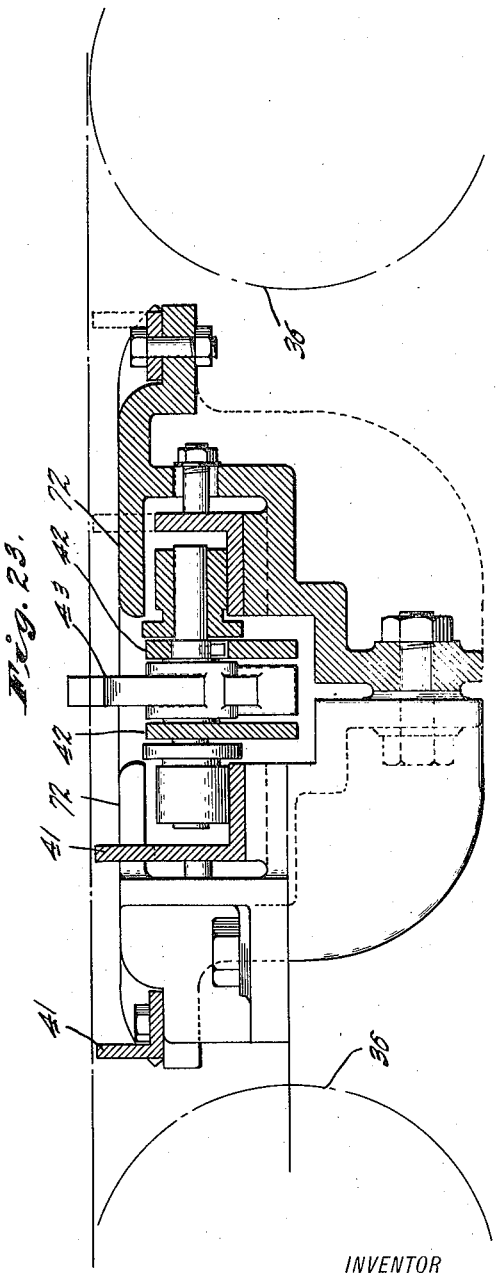
WITNESSES:
INVENTOR
Carl W. A. Koelkebeck,
BY
Hood & Schley
ATTORNEYS

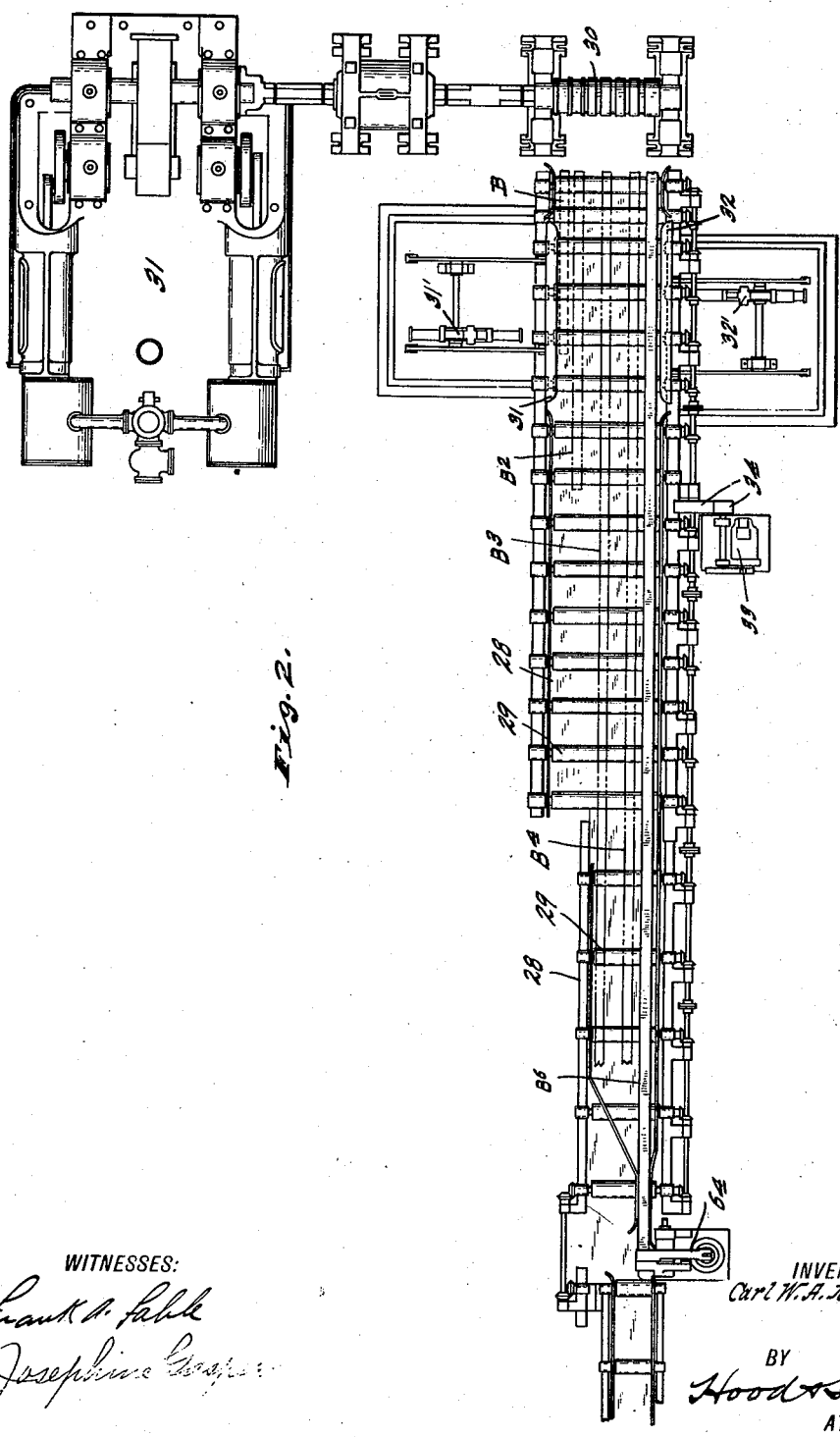

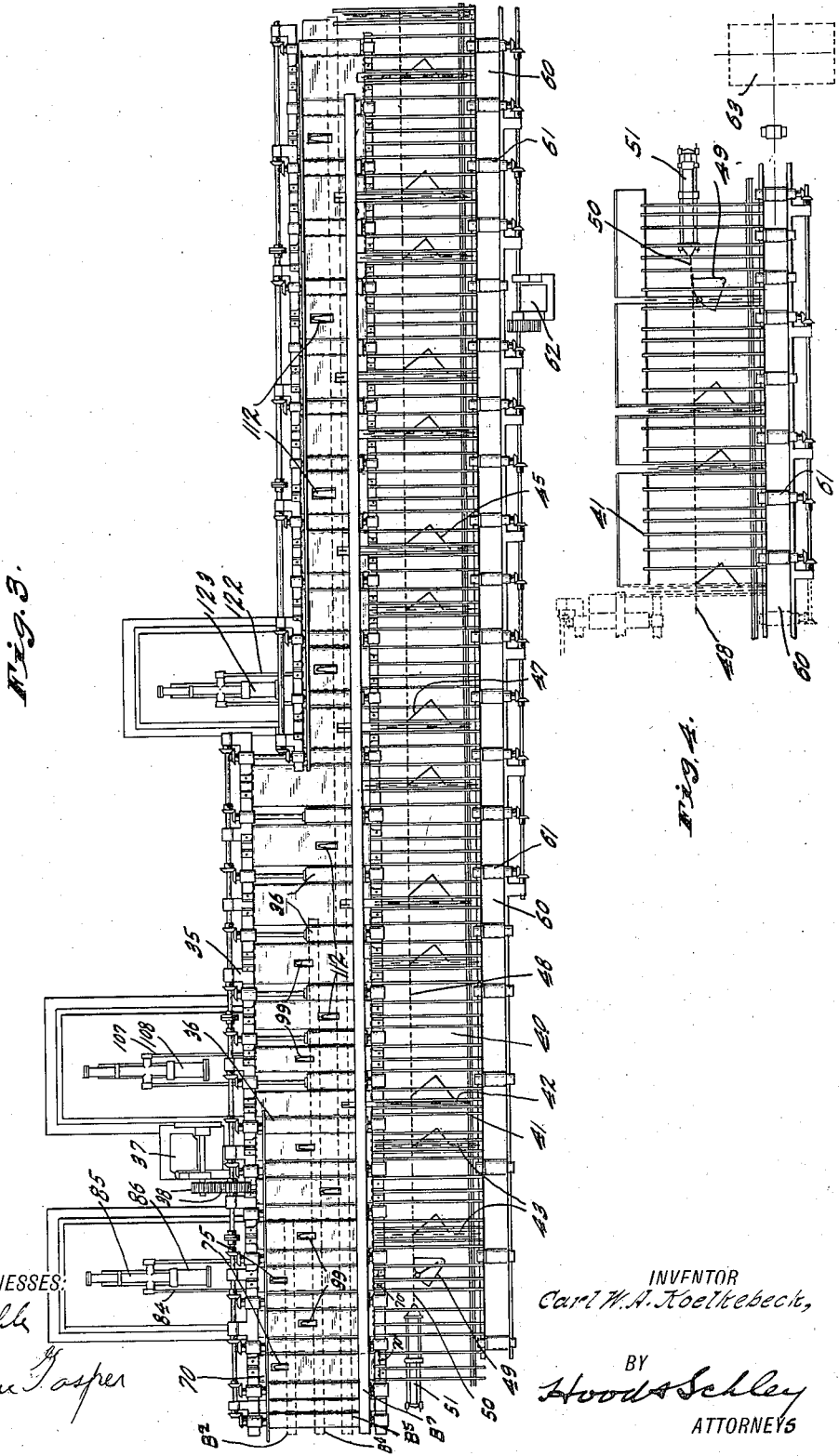

C. W. A. KOELKEBECK.
BAR MILL.
APPLICATION FILED JAN. 10, 1916.
1,191,920.
Patented July 18, 1916.
13 SHEETS—SHEET 4.
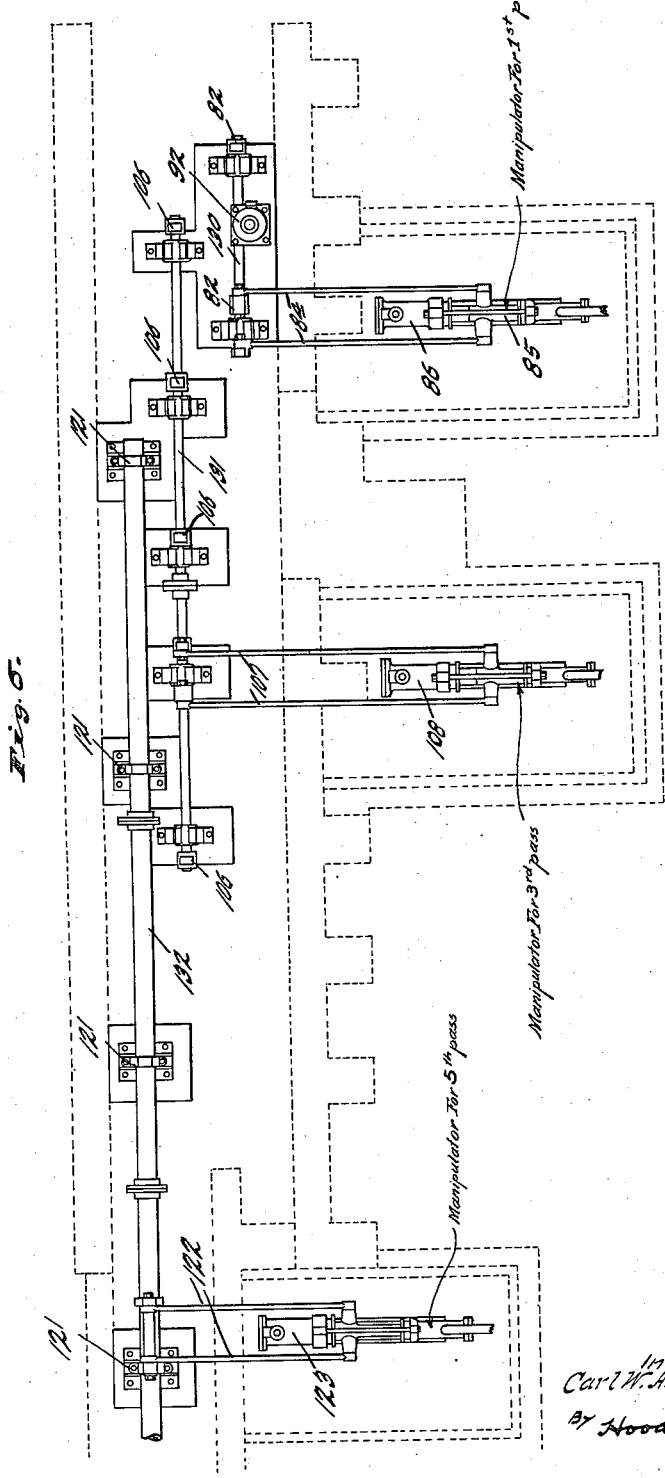
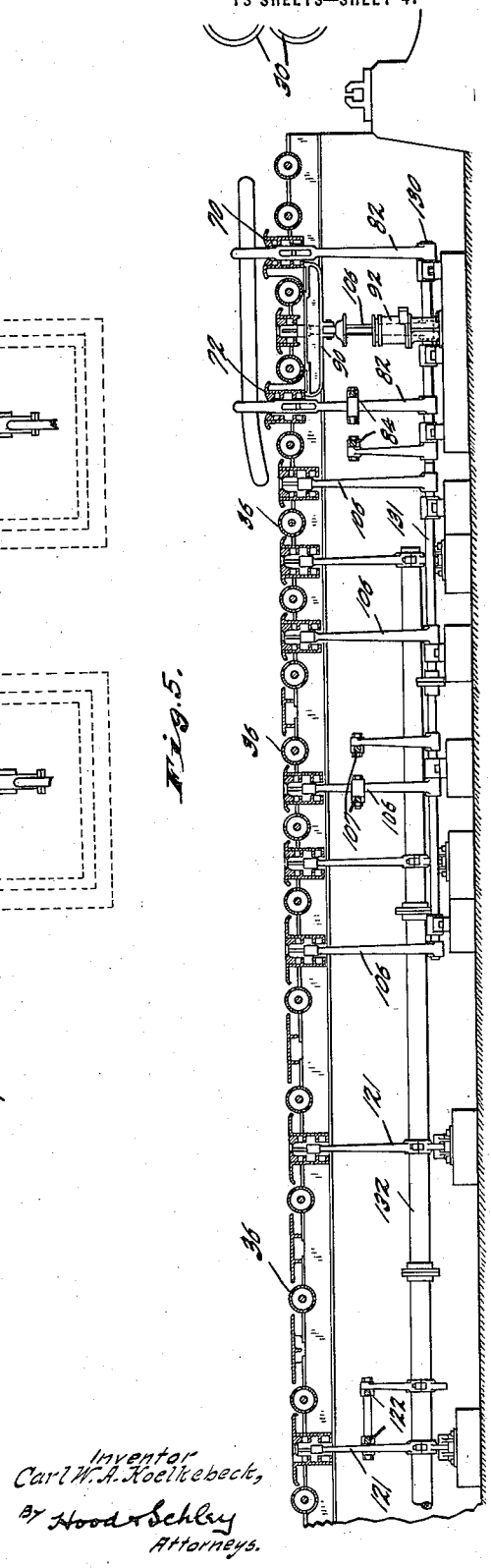
Inventor
Carl W. A. Koelkebeck,
By Hood & Schley
Attorneys.

C. W. A. KOELKEBECK.
BAR MILL.
APPLICATION FILED JAN. 10, 1916.
1,191,920.
Patented July 18, 1916.
13 SHEETS—SHEET 5.
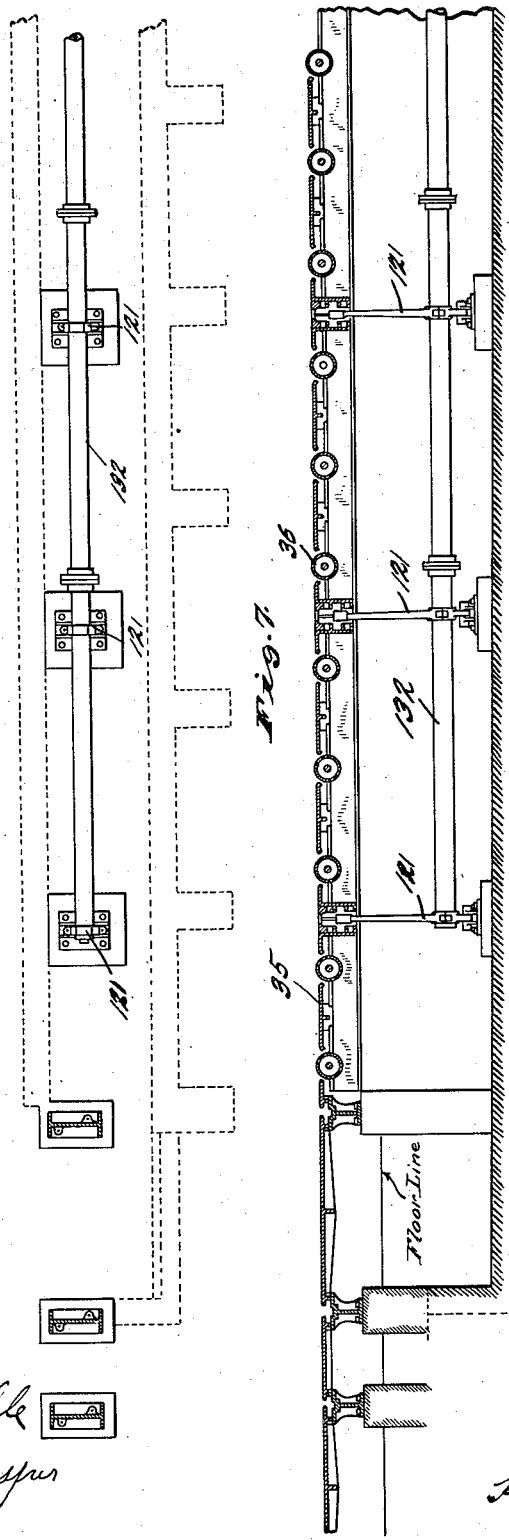

C. W. A. KOELKEBECK.
BAR MILL.
APPLICATION FILED JAN. 10, 1916.

1,191,920.

Patented July 18, 1916.
13 SHEETS—SHEET 6.

WITNESSES:
Frank A. Fahle
Josephine Gasper

INVENTOR
Carl W. A. Koelkebeck,
BY
Hood & Schley
ATTORNEYS

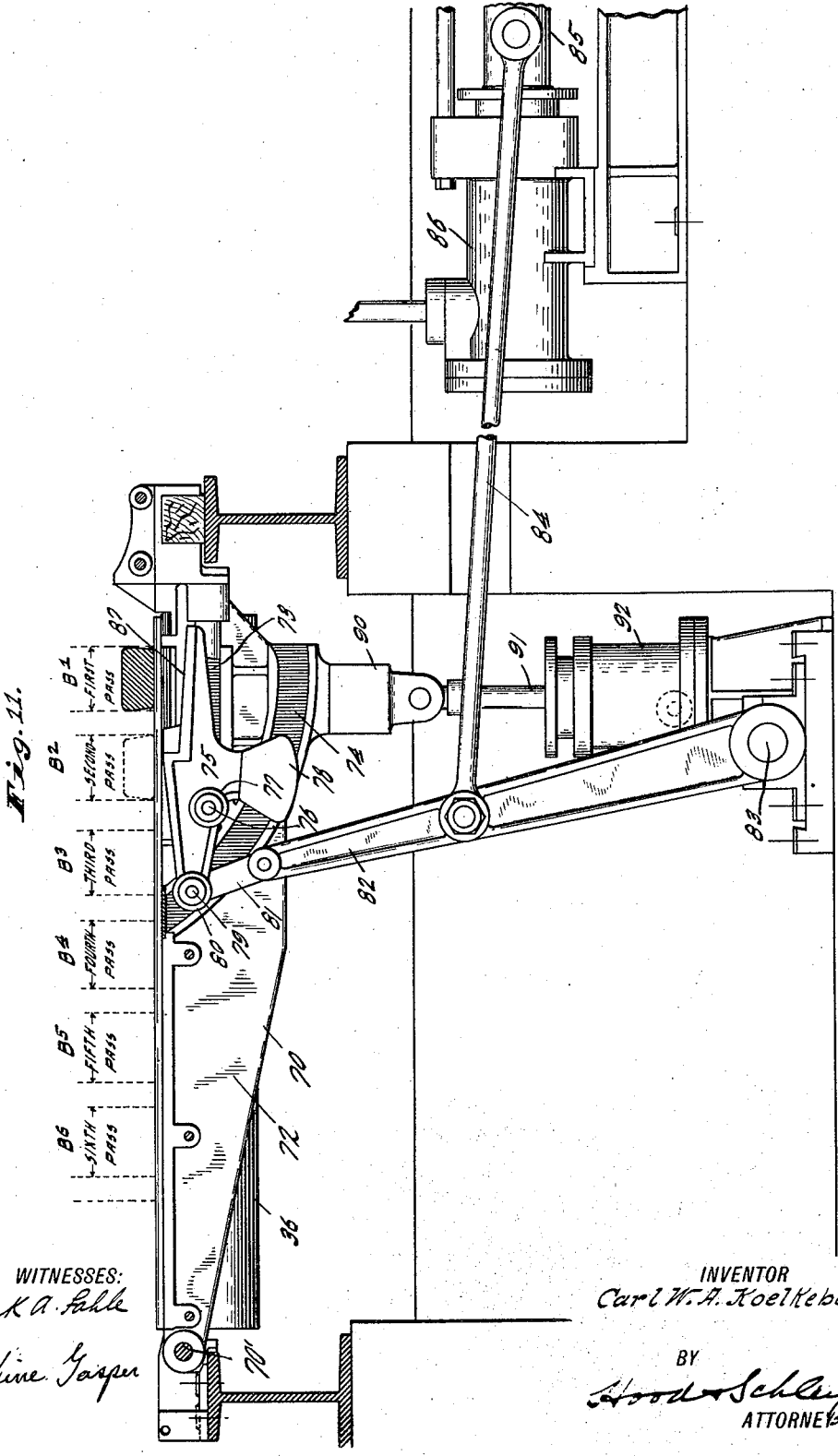

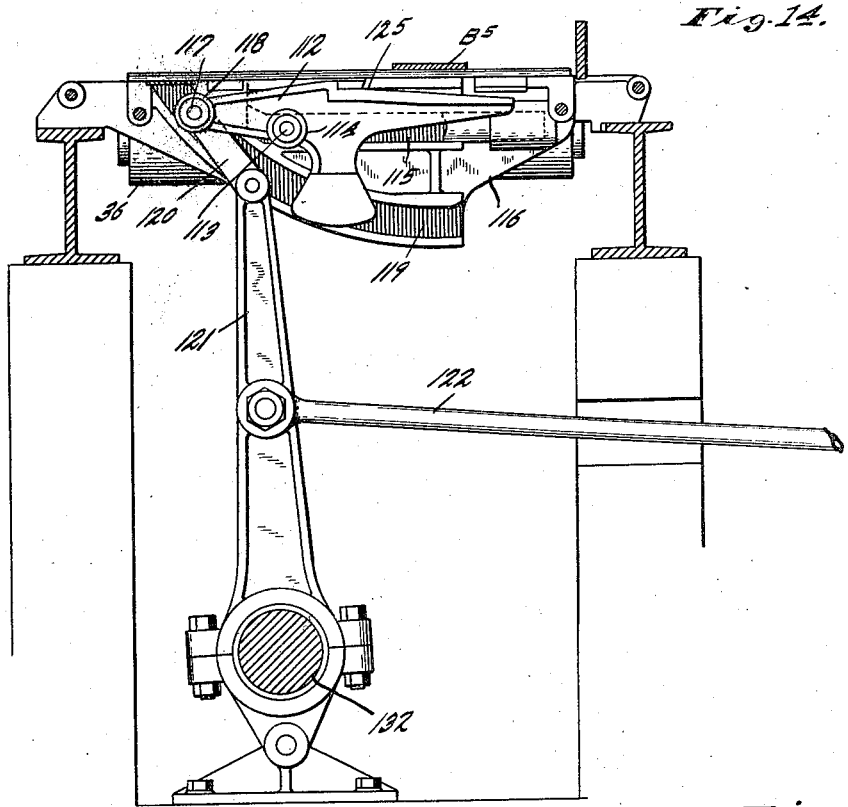
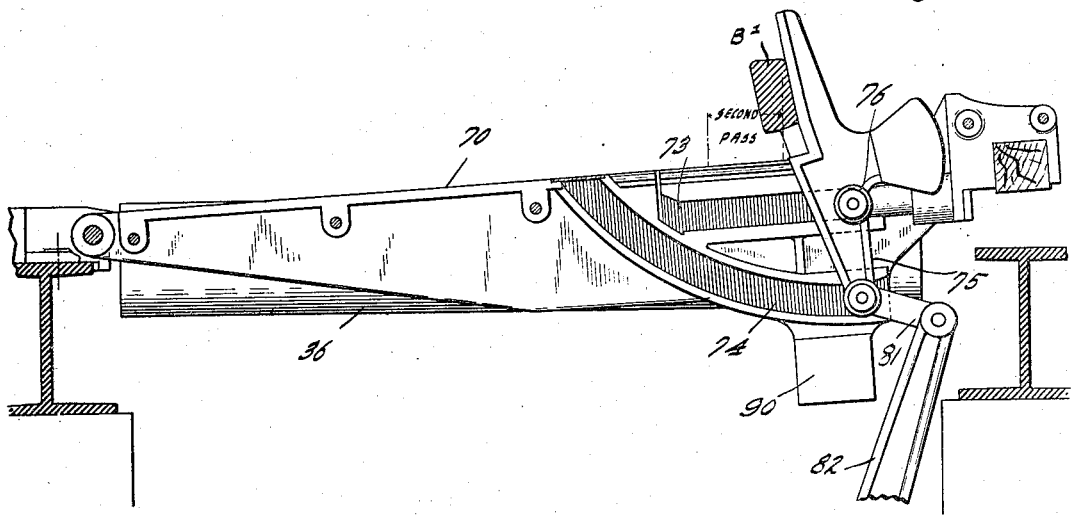

C. W. A. KOELKEBECK.
BAR MILL.
APPLICATION FILED JAN. 10, 1916.
1,191,920.
Patented July 18, 1916.
13 SHEETS—SHEET 9.
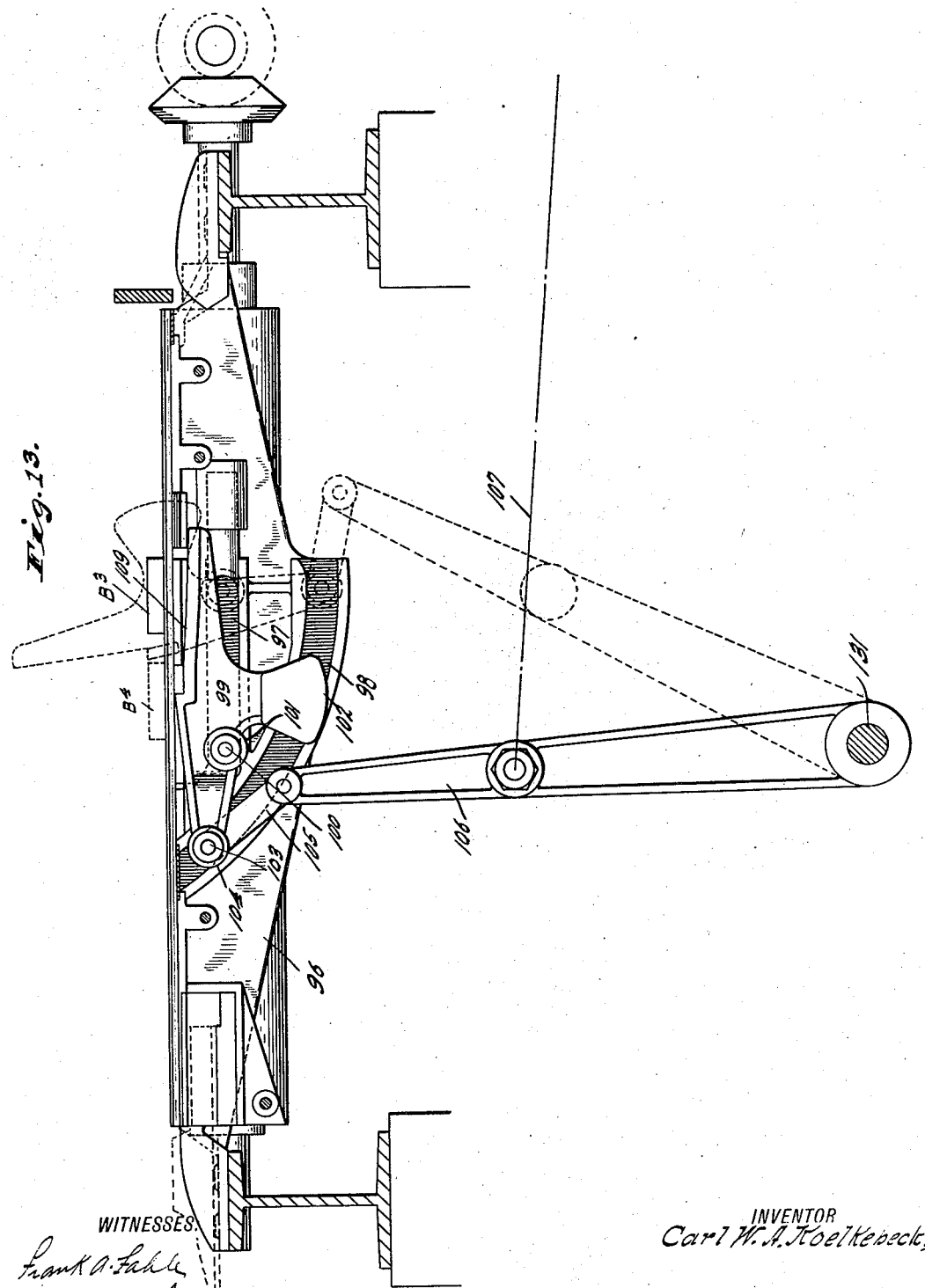
INVENTOR
Carl W. A. Koelkebeck,
BY
Hood & Schley
ATTORNEYS C. W. A. KOELKEBECK.
BAR MILL.
APPLICATION FILED JAN. 10, 1916.
1,191,920.
Patented July 18, 1916.
13 SHEETS—SHEET 10.
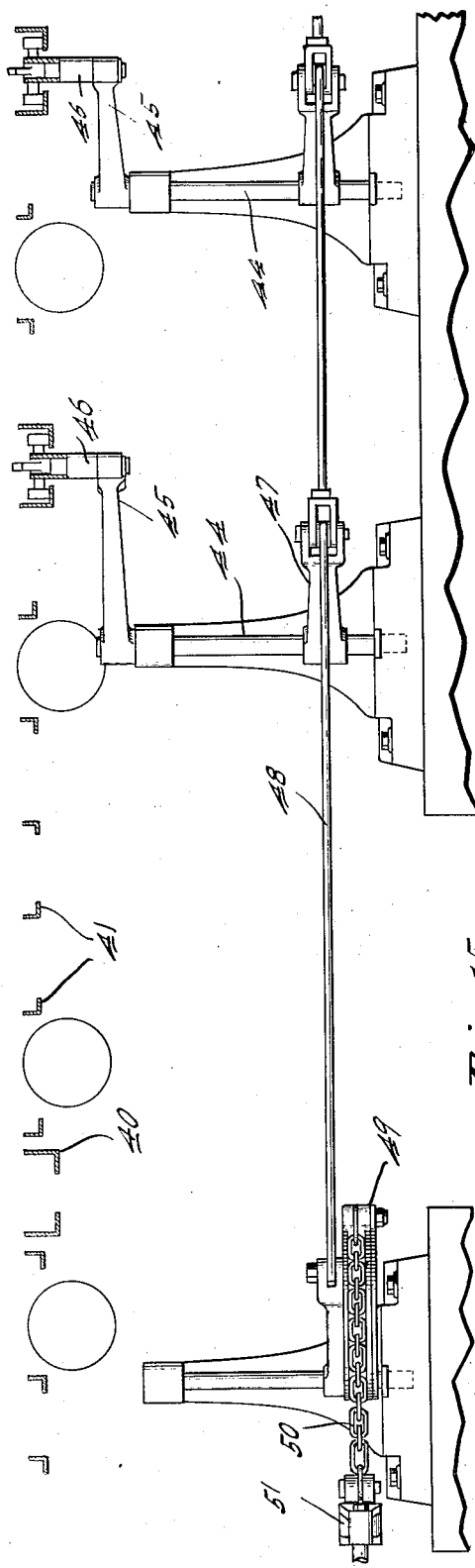
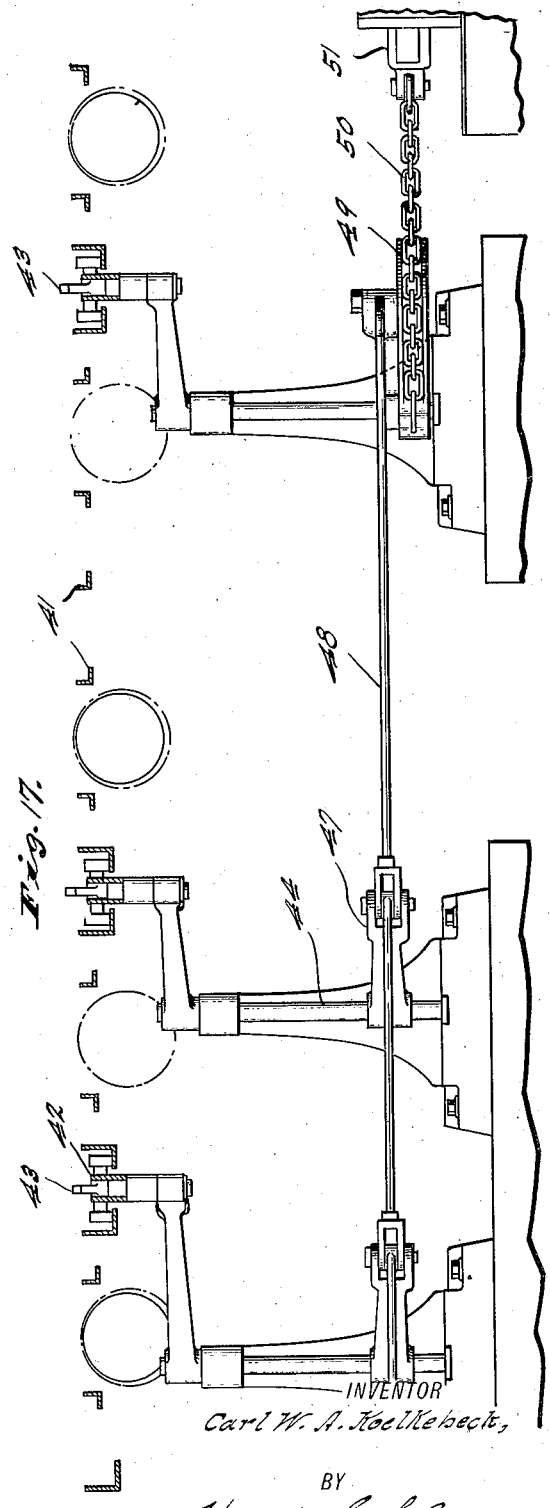
INVENTOR
Carl W. A. Koelkebeck,
BY
Hood & Schley
ATTORNEYS

C. W. A. KOELKEBECK.
BAR MILL.
APPLICATION FILED JAN. 10, 1916.

1,191,920.

Patented July 18, 1916.
13 SHEETS—SHEET 11.

INVENTOR
Carl W. A. Koelkebeck,
BY
Hood & Schley
ATTORNEYS

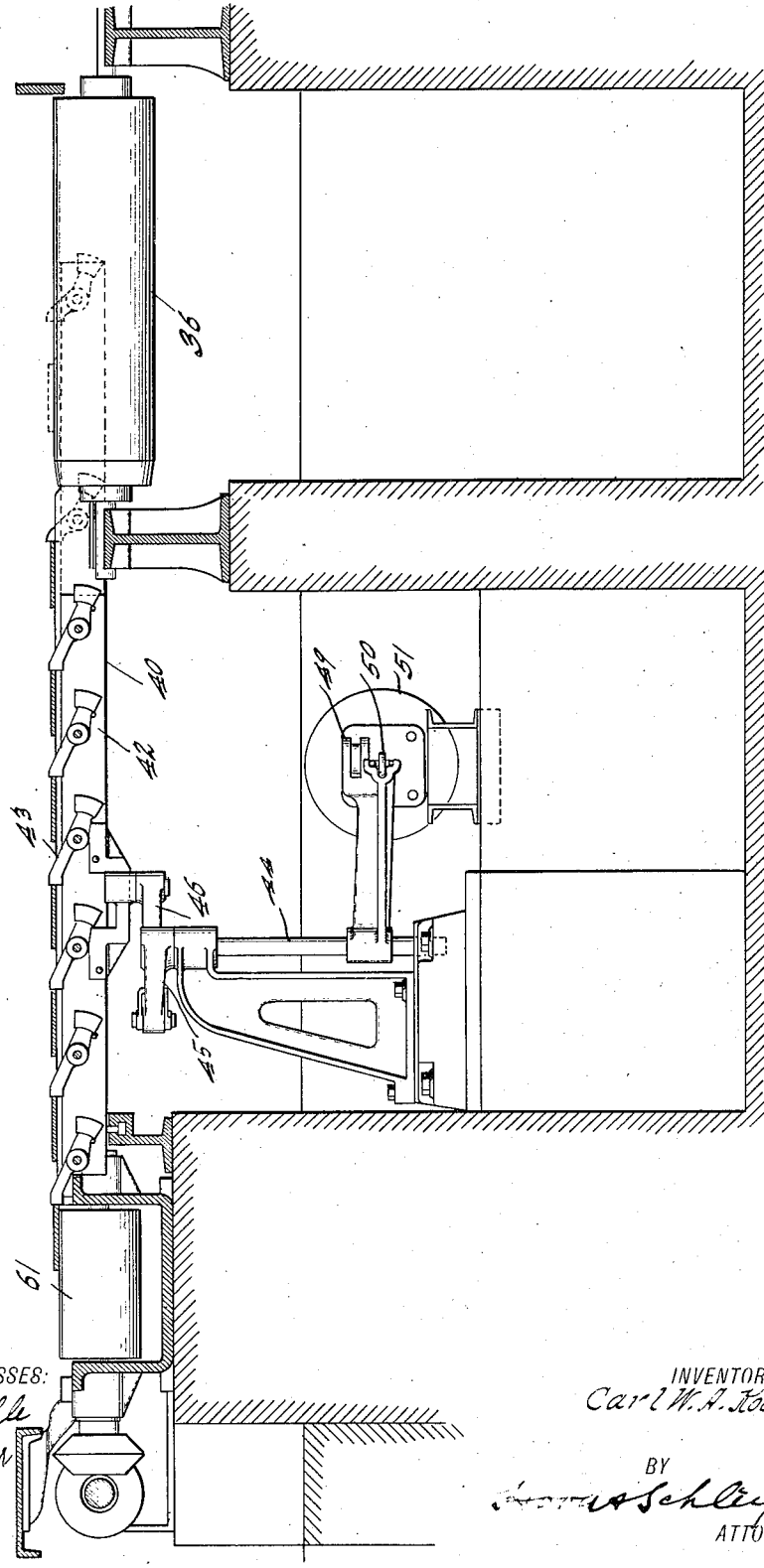

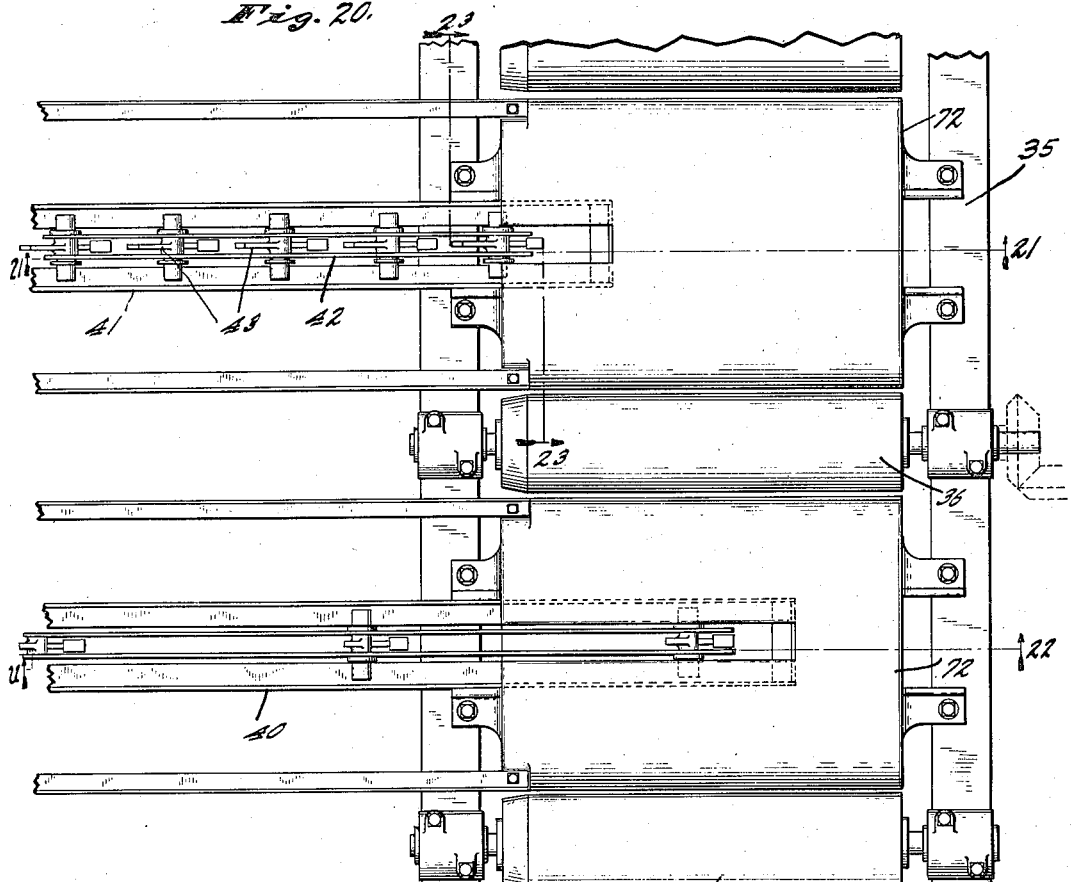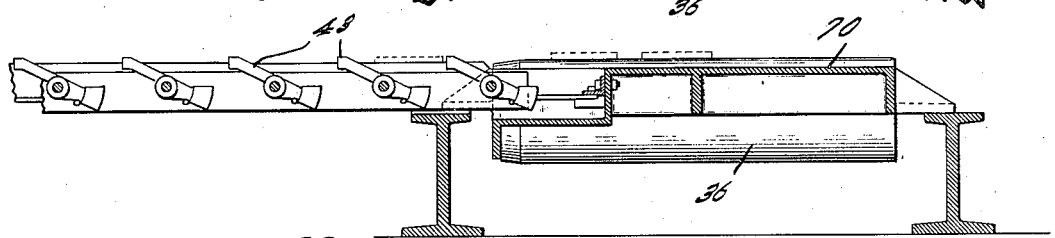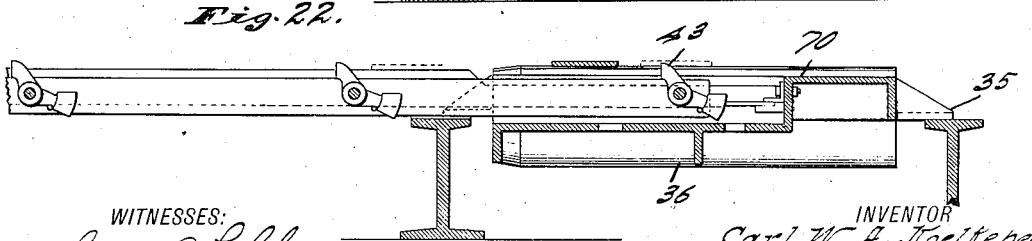

UNITED STATES PATENT OFFICE.

CARL W. A. KOELKEBECK, OF PITTSBURGH, PENNSYLVANIA, ASSIGNOR TO THE NATIONAL ROLL & FOUNDRY COMPANY, OF AVONMORE, PENNSYLVANIA, A CORPORATION OF OHIO.

BAR-MILL.

1,191,920.  Specification of Letters Patent.  Patented July 18, 1916.

Application filed January 10, 1916. Serial No. 71,162.

*To all whom it may concern:*

Be it known that I, CARL W. A. KOELKEBECK, a citizen of the United States, residing at Pittsburgh, in the county of Allegheny and State of Pennsylvania, have invented a new and useful Bar-Mill, of which the following is a specification.

For many years it has been common practice in rolling mills to rotate bar-forming rolls first in one direction and then in the other, the bars passing through successive passes of rolls in opposite directions. In the operation of such a mill, supporting tables at each side of the rolls are provided, these tables being formed in part of mechanically rotated rollers which serve to assist in driving the bars to and from the forming rolls. In the operation of such a plant, the red hot bar material flakes to a greater or less extent, and it is found in practice necessary to turn the bar material over between successive passes through the forming rolls so as to make sure that flakes do not become embedded in the bars. The turning of the red hot bars has heretofore been accomplished by manual labor, the workmen standing upon the receiving tables and manipulating the bars with tongs. This work of turning the bars is both arduous and dangerous, the principal danger arising from the somewhat distorted condition of the bars as they issue from the forming rolls.

The object of my present invention is to produce mechanical means for turning the red hot bar material and depositing it upon the receiving table in position where it may be automatically returned to the succeeding pass of the forming rolls.

The accompanying drawings illustrate my invention as applied to one table of a reversing rolling mill, it being understood that if turning of the bar material is desired after each pass through the forming molds, similar turning mechanism may be applied to the other receiving table.

Figure 10:
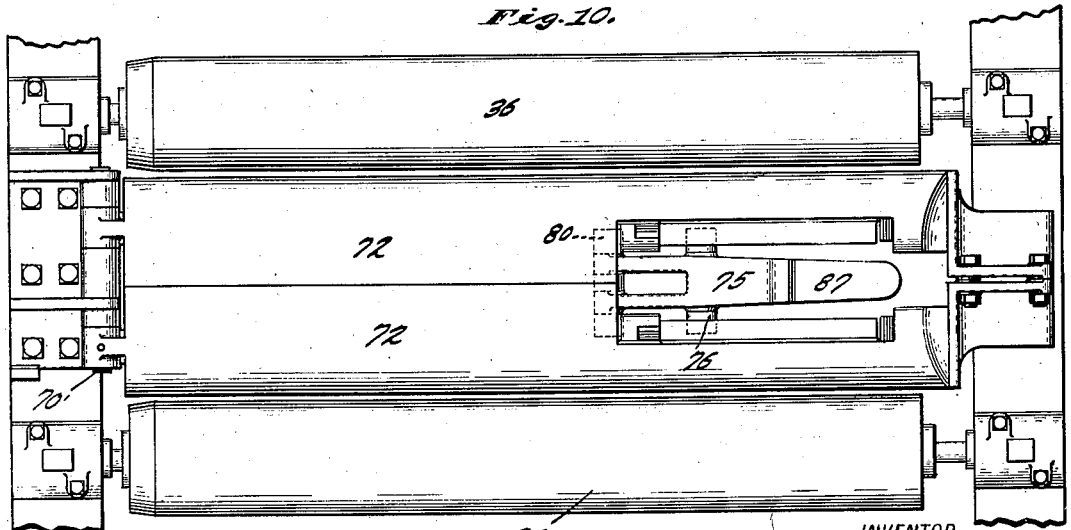
Figure 16:
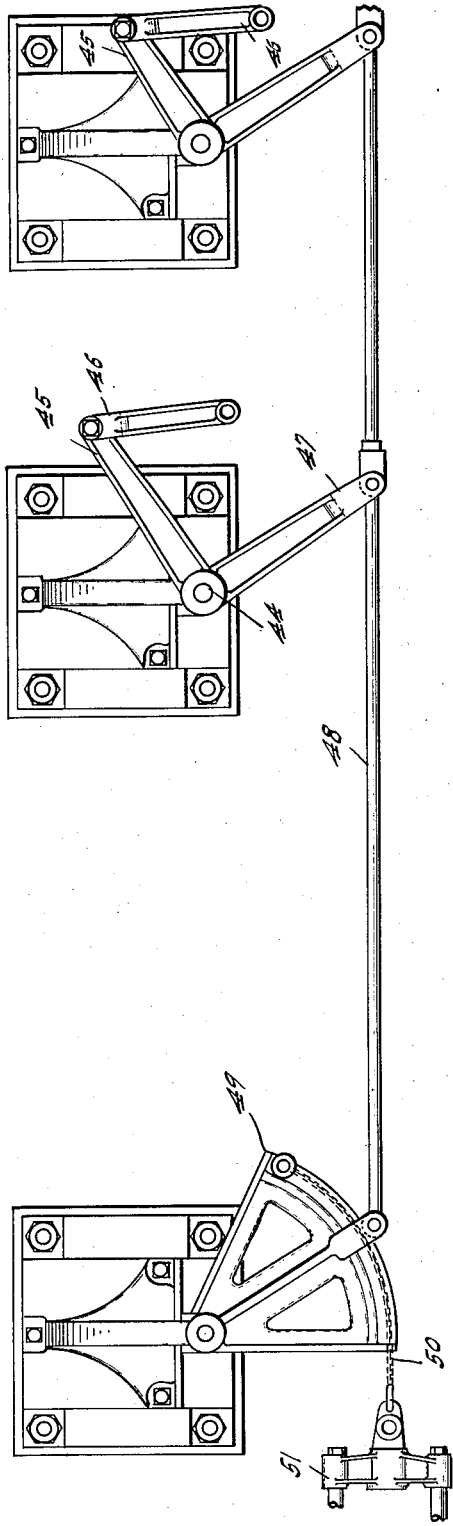
Figure 18:
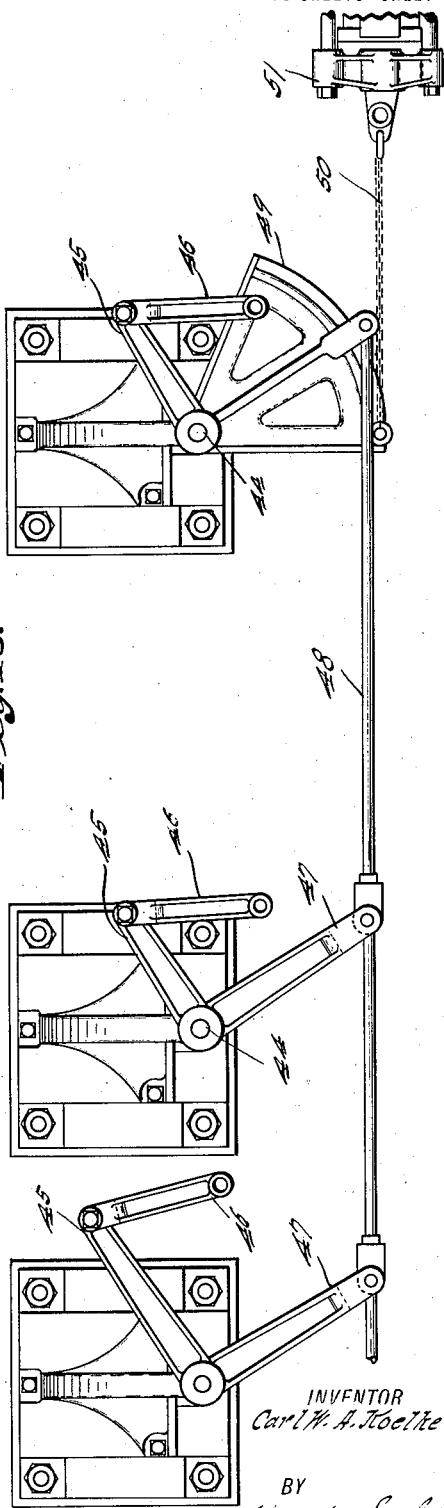

Figure 1 is a plan on a very small scale of the complete plant, including the reheating furnace and steam hammer; Fig. 2 a plan of the reversing rolls, operating engine, and first receiving table, on a scale larger than that of Fig. 1; Fig. 3 a plan of the major portion of the second receiving table on the same scale as Fig. 2; Fig. 4 a plan of the final end of the second table, the matching portion of Fig. 3 being shown in dotted lines; Fig. 5 a vertical longitudinal section of Fig. 3, reversed, however, so that the righthand end of Fig. 5 corresponds to the lefthand end of Fig. 3; Fig. 6 a plan of the manipulators and shafting shown in Fig. 5; Fig. 7 a vertical longitudinal section of the righthand end of Fig. 3, Fig. 7 being reversed so that the lefthand end of Fig. 7 shows parts beyond the righthand end of Fig. 3; Fig. 8 a plan of the manipulator shafting shown in Fig. 7; Fig. 9 a vertical section, longitudinally of the receiving table, on a scale considerably larger than that of Fig. 3, through the tracks of the two first-pass turners and through one of the tracks of the third pass turners; Fig. 10 a plan of one of the first pass turners; Fig. 11 a side elevation of one of the first pass turners, one-half of the track therefor having been removed, and the turner being shown in its normal position; Fig. 12 a view of some of the parts shown in Fig. 11, the track being elevated and the turner being shown at its final position where the bar material is just ready to drop into position for the second pass; Fig. 13 a side elevation of the third pass turner, one-half of the track therefor having been removed; Fig. 14 a side elevation of the fifth pass turner, one-half of the track having been removed; Fig. 15 a vertical section showing the means for operating some of the bar shifters at the lefthand end of the cooling table shown in Fig. 3; Fig. 16 a plan of the rock shafts and levers shown in Fig. 15; Fig. 17 a view similar to Fig. 15 showing some of the bar shifters of Fig. 4; Fig. 18 a plan of the rock shafts and levers shown in Fig. 17; Fig. 19 a transverse section showing one of the bar shifters; Fig. 20 a plan of two of the bar shifters and adjacent parts; Fig. 21 a section on line 21—21 of Fig. 20; Fig. 22 a section on line 22—22 of Fig. 20; and Fig. 23 an enlarged section on line 23—23 of Fig. 20.

In the drawings, 25 indicates reheating furnaces from which ingots are delivered by the usual delivery mechanism 26 to a steam hammer 27, where they are preliminarily shaped and then delivered to the first receiving table 28, said table comprising a plurality of power-driven rollers 29 by means of which the initially formed bar is delivered to the first pass of the rolls 30, said rolls being driven first in one direction and then the other by the reversing engine 31. The initial bar is indicated in dotted lines in Fig. 2 at B. Mounted upon table 28, so as to slide transversely thereof, are pusher bars 31 and 32 which may be moved transversely of the table by the usual manipulators 31' and 32'. These devices are in common use for the shifting of the bars on the receiving table and, therefore, need no further description. The rollers 29 are driven first in one direction and then the other by motor 33 connected by gears 34 with the roller driving shaft, the said engine being of a common reversing type, the details of which are too well known to need further illustration.

Beyond the rolls 30 is a receiving table 35 equipped with power-driven feeding rollers 36 driven by motor 37 and connecting gears 38. Flanking the table 35 is a cooling grid 40 provided at various points in its length with transverse tracks 41, in each of which is mounted a reciprocating bar shifter 42. Each of the bar shifters 42 is provided with gravity pawls 43. The bar shifters 42 are reciprocated by means of vertical rock shafts 44, each of which is provided at its upper end with a lever 45 connected by a link 46 with the adjacent bar shifter 42. Each of the rock shafts 44 is also provided with an arm 47 connected to a rod 48 which is connected to a segment 49 to which is attached a chain 50 coupled with the piston rod of a pneumatic shifter 51. The rod 48 runs the entire length of the cooling grid and is connected at each end with a segment 49, each of said segments being connected in a manner described with a shifter 51 so that the rod 48 is always a tension rod. Some of the bar shifters, as indicated in dotted lines in Fig. 3, are longer than others so as to extend into the side of table 35 and these longer bar shifters are given a longer stroke than the others, this longer stroke being provided for by a lengthening of the arm 45, as shown at the middle of Fig. 16, and the lefthand end of Fig. 18.

Flanking the cooling grid is a delivery table 60 equipped with power-driven feeding rolls 61 which are rotated by a motor 62, this delivery table 60 delivering to shears 63 (dotted lines Fig. 4). The table 28 is equipped with shears 64 (Fig. 2) by means of which the bar material may be cut into two lengths just prior to the final pass through the rolls 30. The several motors and actuators 31', 32' and 51 are controlled in a usual manner by suitable switches and valves from a controlling pulpit 65 (Fig. 1).

Extending transversely across table 35 close to the rolls 30 are two turner tracks 70 (Figs. 3, 9, 11 and 12), each member 71 of which carries upon its inner face a track member 72 forming a straight horizontal track 73 and a curved track or cam 74. Arranged between the members 72, 72 is a turner finger 75 provided at an intermediate point in its length with oppositely projecting pivot pins 76 carrying rollers 77 mounted in the tracks 73. Below the pivot pins 76, the turner 75 is provided with a counter-weight 78. To one side of pivot pins 76 is a parallel pivot pin 79 equipped with rollers 80 which run in the cam tracks 74. Pivotally connected to pins 79 is a link 81 which is attached to an operating lever 82 pivoted at 83. Lever 82 is connected by a link 84 with the piston rod 85 of a pneumatic actuator 86 of any desired type. The free end of turner 75 is provided upon its upper surface with a notch or cradle 87 for the reception of the bar material $B^1$ after it has passed through the first pass of the rolls 30 and normally all portions of the turner lie below the upper surface of the track 70, as shown in Fig. 11. The two track structures 70, each pivoted on a pin 70', are connected at their free ends by a bridge piece 90 which is supported by the piston rod 91 of a pneumatic actuator 92, the arrangement being such that the track structures may be raised at their free ends to the position shown in Fig. 12.

The bar material B, after it passes through the first pass of the rolls 30, arrives at the position $B^1$ (Fig. 11) immediately above the cradles 87 of turners 75 and, as the material at this time is comparatively short, two of the turners 75 are sufficient to handle it. Immediately upon the arrival of the bar material at the position $B^1$, the operator in the pulpit 65, by the manipulation of proper valves 93 and 94, causes an actuation of the manipulators 92 and 86, respectively, the turners 75 being thus shifted to the position shown in Fig. 12 and the tracks 70 being raised to the position shown in the same figure. The turners 75 are given both a lateral and turning movement so that, as they come up beneath the material $B^1$, they raise it and turn it with comparatively little lateral shifting so that, when the position shown in Fig. 12 is reached, the material will drop to the position $B^2$ (Figs. 3 and 11). Thereupon, the rollers 36 will be started in the proper direction to drive the material through the second pass of the rolls 30 from which it will be delivered to the position $B^2$ (Fig. 2) on table 28. Thereupon, the operator will, in the usual manner, by operation of the manipulators 31' and 32', shift the material to the position $B^3$ (Fig. 2) on table 28. The feed rollers 29 will then be actuated to drive the material to the third pass of the rolls 30 and it will be delivered to the position $B^3$ on table 35 (Figs. 11 and 13). Distributed at proper points in the length of table 35 and extending transversely thereof, are track structures 96 which are similar to the track structures 70. Each of these track structures 96 is provided with a pair of straight cam tracks 97 and a pair of curved cam tracks 98. Arranged between the pairs of cam tracks is a turner 99 provided with a pivot 100, equipped with rollers 101 lying in the tracks 97, and also equipped with a counter-weight 102. Each turner 99 is also provided with guide pins 103 carrying rollers 104 which traverse the cam tracks 98. Connected to pin 103 is a link 105 which is connected to an operating lever 106 connected by links 107 (Figs. 3, 5 and 6) with a pneumatic actuator 108 similar to the actuator 86. Each turner 99 is provided upon its upper free end with a cradle 109 formed to receive the bar material at the position $B^3$ and to turn it to the position $B^4$ (Figs. 3 and 13). By the time the bar reaches the position $B^3$, it is likely to be crooked and for that reason the cradle 109 has a somewhat greater lateral extent than the cradle 87 of turner 75. When the material has reached the position $B^4$, the rollers 36 will be actuated to deliver it to the fourth pass of the rolls 30 and from there will be delivered to the table 28 and be shoved by the pushers 31 and 32 to the position $B^4$ on table 28 (Fig. 2), the rollers 29 being driven in the proper direction to assist in the withdrawal of the material from the rolls 30. The rollers 29 will then be reversed and the material delivered to the fifth pass of the rolls 30 and from thence to the position $B^5$ (Figs. 11 and 14) where it will lie immediately above turners 112. Each of these turners like the others is provided with a pivot pin 113 equipped with rollers 114 running in horizontal tracks 115 in the track structures 116. Each turner 112 is also provided with a pin 117 equipped with rollers 118 running in the curved cam tracks 119 of the track structure 116, each turner being connected by link 120 with an operating lever 121 connected by link 122 with an actuator 123. Each turner 112 is provided with a cradle 125 for the reception of the bar material so that when the turner is actuated, in a manner described in connection with the operation of the other turners, the bar material will be turned into the position $B^6$ (Figs. 3 and 11). Thereupon, the rollers 36 will be again reversed and the material delivered to the sixth pass of rolls 30 and from thence to position $B^6$ on table 28 (Fig. 2). By this time the bar has attained a very considerable length and it will be cut into two pieces by shears 64 and the two pieces then delivered in succession to the final pass of the rolls 30 issuing from thence to the position $B^7$ (Fig. 3) on table 35. By this time the bar overlies the longer bar shifters 42, as clearly shown in Fig. 3, and thereafter the regular reciprocation of these shifters 42 shifts the bar material successively across the cooling grid, as indicated in Fig. 19, and delivers it when finally cooled, to the delivery table 60 from which it is delivered to the shears 63. The turners of each set are connected together for simultaneous actuation, the levers 82 of turners 75 being attached to a shaft 130 (Fig. 6); the levers 106 of the turners 99 being connected to a shaft 131 and the levers 121 of turners 112 being connected to a shaft 132.

I claim as my invention:

1. The combination, with the receiving table of a rolling mill, of a bar turner comprising a track structure arranged substantially parallel with the rolls, a vertically swinging turner mounted in said track structure and cooperating therewith to simultaneously swing and slide to engage and turn a bar upon the table, and means for simultaneously swinging the turner vertically and for shifting the same in the track structure in the direction opposite to the lateral shifting of the bar material, whereby the bar material may be turned through an angle of 180° with sufficient lateral shifting to register with a new pass of the rolls.

2. The combination, with the receiving table of a rolling mill, of a bar turner comprising a track structure arranged substantially parallel with the rolls, a vertically swinging turner mounted in said track structure and cooperating therewith to simultaneously swing and slide to engage and turn a bar upon the table, means for vertically swinging said track structure, and means for simultaneously swinging the turner vertically and for shifting the same in the track structure in the direction opposite to the lateral shifting of the bar material, whereby the bar material may be turned through an angle of 180° with sufficient lateral shifting to register with a new pass of the rolls.

3. The combination, with the receiving table of a rolling mill, of a bar turner comprising a track structure, a turner mounted in said track structure and cooperating therewith to simultaneously swing and slide to engage and turn a bar upon the table, means for vertically swinging said track structure, and means for shifting the turner in said track structure.

4. The combination, with the receiving table of a rolling mill, of a bar turner comprising a track structure, a turner mounted in said track structure and cooperating therewith to simultaneously swing and slide to engage and turn a bar upon the table, said turner having its pivot support shifted laterally beneath the turning bar, and means for shifting the turner in said track structure.

5. The combination with the receiving table of a rolling mill, of a track structure extending transversely of the table and provided with a pair of tracks, a swinging turner provided with a pair of pivots arranged each to traverse one of said tracks and also provided with a bar cradle, and means for shifting said turner along said tracks whereby the turner is elevated into engagement with material lying upon the table and swung to turn said material over, the said pivots shifting laterally beneath and in a direction opposite to the movement of such material.

6. In a rolling mill, the combination with the rolls and means for driving the same in either direction, of a receiving table arranged in conjunction with said rolls, feeding rollers forming part of said receiving table, means for driving said feeding rolls in either direction, a plurality of series of turners arranged in different lines laterally of the receiving table, each of said turners lying normally beneath the feeding plane and having means to engage and turn bar material upon the table and to thereby shift it laterally upon the table to a new roll pass, and means for operating said turners in series.

7. In a rolling mill, the combination with the rolls and means for driving the same in either direction, of a receiving table arranged in conjunction with said rolls, a plurality of series of turners arranged in different lines laterally of the receiving table, each of said turners being normally below the plane of the receiving table and having means to engage and turn bar material upon the table and to thereby shift it laterally upon the table to a new roll pass, and means for operating said turners in series.

8. In a rolling mill, the combination with the rolls and means for driving the same in either direction, of a receiving table arranged in conjunction with said rolls, feeding rollers forming part of said receiving table, means for driving said feeding rolls in either direction, a plurality of series of turners arranged in different lines laterally of the receiving table, each of said turners comprising a track structure arranged laterally of the table and having two tracks, a turner normally beneath the feeding plane and provided with a pair of pivots each projected into one of said tracks, said turner having a bar-cradle in its upper face, and means for shifting said turners in their tracks to bring the same upwardly into engagement with material lying upon the table to turn and laterally shift the same upon the table.

9. In a rolling mill, the combination with the rolls and means for driving the same in either direction, of a receiving table arranged in conjunction with said rolls, a plurality of series of turners arranged in different lines laterally of the receiving table, each of said turners comprising a track structure arranged laterally of the table and having two tracks, a turner normally beneath the feeding plane and provided with a pair of pivots each projected into one of said tracks, said turner having a bar-cradle in its upper face, and means for shifting said turners in their tracks to bring the same upwardly into engagement with material lying upon the table to turn and laterally shift the same upon the table.

10. The combination with a reversing rolling mill, of a receiving table, means forming part of said table for longitudinally shifting material in either direction thereon, turners associated with said receiving table and normally below the plane thereof for engaging, turning and laterally shifting material on the table, means for actuating said turners, a cooling grid flanking said table, and shifting members movable laterally of the receiving table and cooling grid for engaging material on the receiving table and shifting the same laterally to the cooling grid.

11. The combination with a reversing rolling mill, of a receiving table and normally below the plane thereof, turners associated with said receiving table for engaging, turning and laterally shifting material on the table, means for actuating said turners, a cooling grid flanking said table, and shifting members movable laterally of the receiving table and cooling grid for engaging material on the receiving table and shifting the same laterally to the cooling grid.

12. In a reversing rolling mill, the combination with the rolls, reversing driving means therefor, and a receiving table provided with means for driving bar material toward and from the rolls, of turning members associated with said table and normally below the plane thereof, and means for mechanically shifting said turning members to raise the same into engagement with material upon the table and to turn said material.

13. The combination, with the receiving table of a rolling mill, of a bar turner comprising a track structure arranged transversely of said table and provided with a pair of cam tracks, one beneath the other and both below the receiving plane of the table, a turner having its upper face normally below the receiving plane of the table and having an intermediate pivotal support mounted in one of said cam tracks and an eccentric guide mounted in the other of said cam tracks, means for shifting said turner along the cam tracks whereby a portion of the turner is projected above and swung relative to the receiving plane of the table, and means for raising the receiving surface of the track structure above the plane of the receiving table.

14. The combination, with the receiving table of a rolling mill, of a bar turner com prising a track structure arranged transversely of said table and provided with a pair of cam tracks, one beneath the other and both below the receiving plane of the table, a turner having its upper face normally below the receiving plane of the table and having an intermediate pivotal support mounted in one of said cam tracks and an eccentric guide mounted in the other of said cam tracks, and means for shifting said turner along the cam tracks whereby a portion of the turner is projected above and swung relative to the receiving plane of the table.

In witness whereof, I have hereunto set my hand at Avonmore, Pennsylvania, this 22d day of December, A. D. one thousand nine hundred and fifteen.

CARL W. A. KOELKEBECK.